United States Patent
Polansky

(10) Patent No.: US 9,160,923 B1
(45) Date of Patent: Oct. 13, 2015

(54) METHOD AND SYSTEM FOR DYNAMIC INFORMATION DISPLAY USING OPTICAL DATA

(71) Applicant: Amazon Technologies, Inc., Reno, NV (US)

(72) Inventor: Stephen Michael Polansky, Santa Clara, CA (US)

(73) Assignee: Amazon Technologies, Inc., Reno, NV (US)

( * ) Notice: Subject to any disclaimer, the term of this patent is extended or adjusted under 35 U.S.C. 154(b) by 35 days.

(21) Appl. No.: 13/942,209

(22) Filed: Jul. 15, 2013

(51) Int. Cl.
*H04N 5/232* (2006.01)

(52) U.S. Cl.
CPC .................................. *H04N 5/23222* (2013.01)

(58) Field of Classification Search
USPC ........................................ 348/333.12, 333.13
See application file for complete search history.

(56) References Cited

U.S. PATENT DOCUMENTS

| | | | |
|---|---|---|---|
| 8,593,558 B2 * | 11/2013 | Gardiner et al. | 348/333.12 |
| 2005/0184972 A1 * | 8/2005 | Tashiro et al. | 345/173 |
| 2007/0052832 A1 * | 3/2007 | Bae et al. | 348/333.12 |
| 2012/0100888 A1 * | 4/2012 | Kim | 455/556.1 |
| 2013/0234931 A1 * | 9/2013 | Keranen et al. | 345/156 |
| 2014/0055427 A1 * | 2/2014 | Kim et al. | 345/179 |
| 2014/0168135 A1 * | 6/2014 | Saukko et al. | 345/174 |
| 2015/0015495 A1 * | 1/2015 | Narayanaswami et al. | 345/173 |

* cited by examiner

*Primary Examiner* — Albert Cutler
(74) *Attorney, Agent, or Firm* — Novak Druce Connolly Bove + Quigg LLP

(57) ABSTRACT

A computing device can capture optical data using optical sensors. In some embodiments, the optical sensors can include front-facing light sensors, image sensors, cameras, etc. The optical data captured by each respective optical sensor can be analyzed to determine an amount of light received by the respective optical sensor. Based, at least in part, on which optical sensors are detecting light and how much light those sensors are detecting, the device can determine (e.g., deduce, predict, estimate, etc.) an area of a device display screen that is likely to be unobstructed by an environment (or portion thereof) in which the device is situated. The area of the display screen that is likely unobstructed can likely be visible to a user of the device. Accordingly, the computing device can provide information at the area of the display screen that is likely to be unobstructed and/or visible to the user.

15 Claims, 14 Drawing Sheets

METHOD AND SYSTEM FOR DYNAMIC INFORMATION DISPLAY USING OPTICAL DATA

BACKGROUND

Computing devices are becoming more commonplace and are used for a wide variety of purposes. Every day, people use their computing devices to view, access, and/or interact with various types of content, especially as computing devices and applications are growing in number and in function. A user of a computing device may frequently carry his computing device wherever he goes. When not physically interacting with the computing device, the user can store the device in a number of places, such as in a pocket, a bag, or another place. When the user needs to physically access the computing device, he would have to find his device and take it out of his pocket, bag, or other place. In some cases, this can inconvenience, distract, or otherwise interrupt the user. For example, the user can be attending a meeting and does not want to exert much effort to take a glance at his device to tell the time. In another example, the user can receive a text message or other communication when he is watching a movie in a movie theater, and thus the user may not want to take his device entirely out of his pocket or bag to peek at the text message or communication. Accordingly, an improved approach to providing information on computing devices can be beneficial and can enhance the overall user experience associated with using computing devices to view or access information.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to providing information using a computing device. In particular, various embodiments of the present disclosure can provide an approach to analyzing data, such as optical data, in order to determine an area on a display element of a computing device at which to display information, such as information that may be relevant to a user.

At least some embodiments enable a computing device to capture optical data using one or more optical sensors of the computing device. In some embodiments, the one or more optical sensors can include one or more front-facing light sensors, image sensors, infrared (IR) sensors, cameras, etc. The optical data captured by each respective optical sensor can be analyzed to determine an amount of light received by the respective optical sensor. Based, at least in part, on determining which optical sensors are detecting light and assessing how much light those sensors are detecting, the present technology can determine (e.g., deduce, predict, estimate, etc.) one or more areas of a device display screen that are likely to be unobstructed by an environment (or portion thereof) in which the device is situated. The areas of the display screen that are likely to he unobstructed can correspond to areas of the display screen that are likely to be visible to a user of the device. Accordingly, the computing device can provide information at the areas of the display screen that are likely to be unobstructed and/or visible to the user.

In one example, the computing device can be situated in a pocket of a user. The user may find it inconvenient or cumbersome to pull the device entirely out of her pocket. In this example, there can be four front-facing optical sensors, one at each corner of the front face of the device. The sensors can be continuously or periodically detecting whether there are any amounts of light. When the device is entirely in the pocket, the sensors are obstructed by the pocket and detect little or no light. However when the user slightly pulls the device out of her pocket, the two sensors along the edge of the device that is outside the pocket can detect amounts of light, whereas the other two sensors inside the pocket still detect little or no light. As such, the device can observe this change in light detected by the two sensors outside the pocket. The device can deduce that a portion of a device display that is closer to the two sensors outside the pocket will likely be unobstructed by the pocket and likely visible to the user. Accordingly, the device can provide (relevant) information (e.g., time/date, missed calls, incoming communications, buttons, etc.) to the user at the portion of the display.

Various other functions and advantages are described and suggested below as may be provided in accordance with the various embodiments.

Figure 1A:
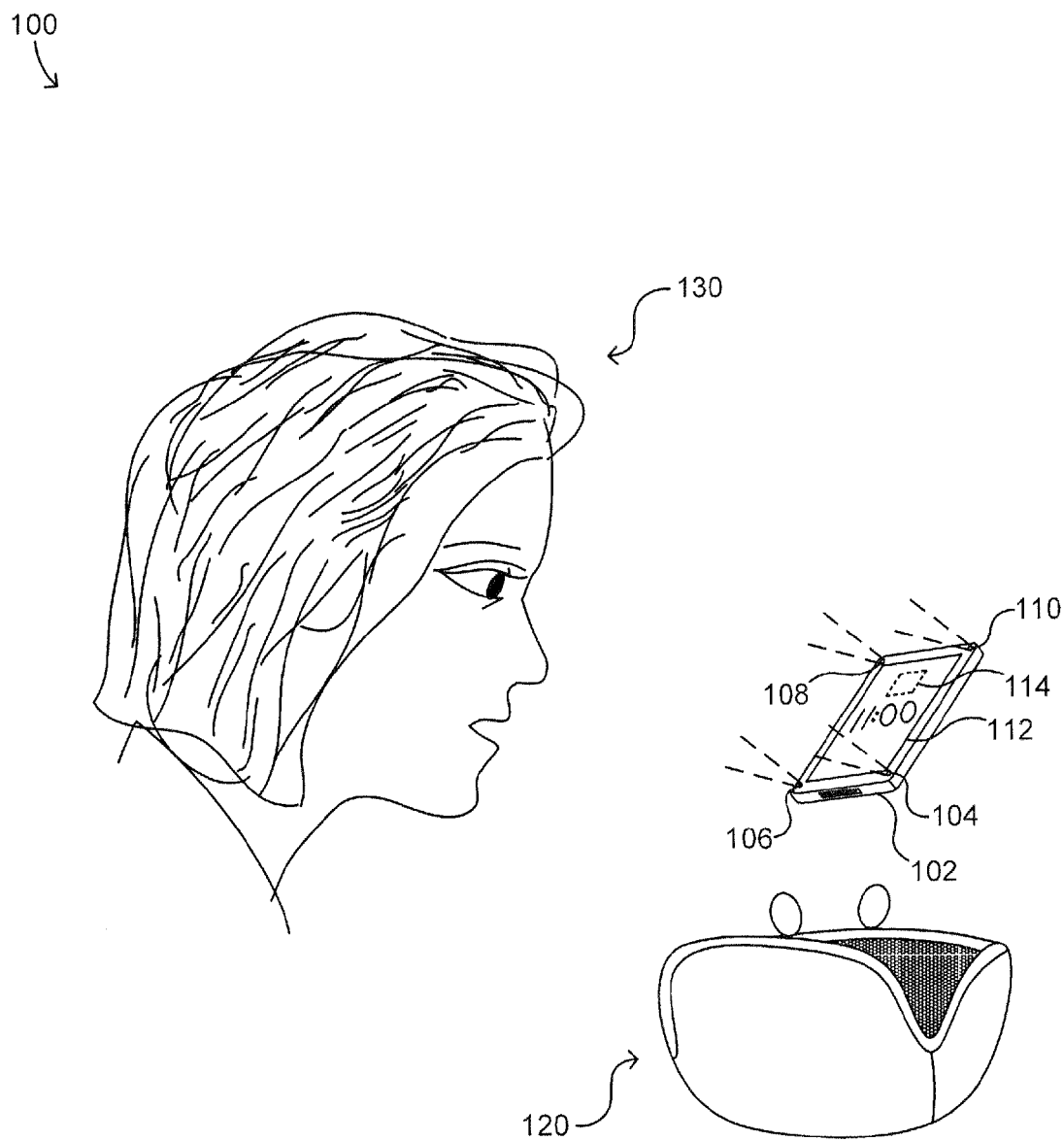
FIG. 1A illustrates an example environment in which aspects of the various embodiments can be utilized.

FIG. 1A illustrates an example environment 100 in which aspects of the various embodiments can be utilized. The example environment 100 can comprise a computing device 102, which can include a plurality of optical sensors (e.g., 104, 106, 108, 110, etc.). The computing device 102 can also include a display 112 configured to provide information, such as time information (e.g., 11:00), to a user 130 of the device 102. Moreover, in some embodiments, the device 102 can include at least one orientation sensor 114, such as a gyroscope or an accelerometer.

In some embodiments, the plurality of optical sensors can include a plurality of image sensors or cameras (e.g., 104, 106, 108, 110, etc.). For example, there can be four cameras (or optical sensors) located on a front face of the device 102. In other words, there can be four front-facing cameras on the device 102. Further, there can be one camera substantially at or near (i.e., located within an allowable distance from) each corner of the front face of the computing device 102.

Each of the cameras (or optical sensors) can be configured to detect an amount of light. In some embodiments, the cameras can be configured to operate in a binary light detection mode, such that each of the cameras can only determine whether or not light can be detected. In some embodiments, the cameras can be configured to detect a range of light intensities (i.e., brightness). For example, the cameras can detect 0% amount of light (i.e., brightness, intensity, etc.) in darkness, ranging to 100% amount of light under the sun.

Figure 1B:
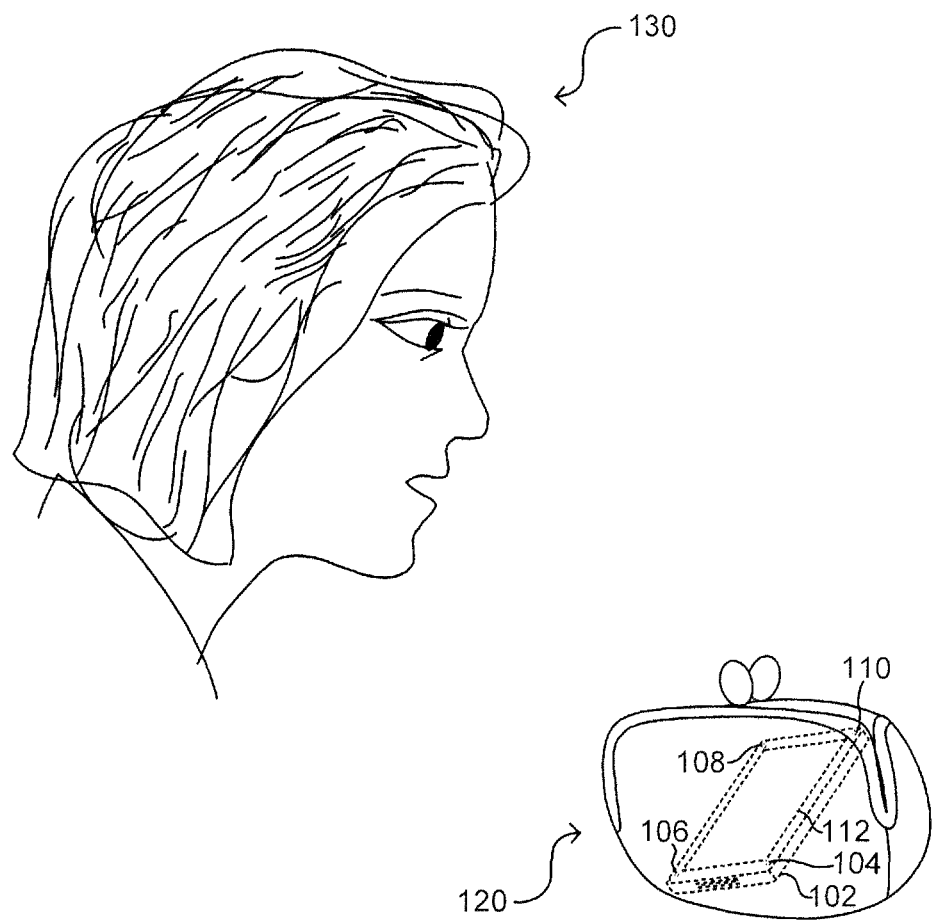
FIG. 1B illustrates an example scenario in which providing information based on analyzing optical data can be utilized.

In one example, there can be an object or environment with which the computing device is situated. The example of FIG. 1A shows that the object or environment can be, for example, a purse 120. It is contemplated that other objects and/or environments consistent with the present disclosure can include (but are not limited to) pockets, bags, suitcases, or physical surfaces, such as a table tops, counter tops, floors, bed tops, or any other tangible surfaces. In the example, the purse 120 can be associated with the user 130 of the device 102. The user 130 can utilize her purse 120 to store her computing device 102, as shown in FIG. 1B FIG. 1B illustrates an example scenario in which providing information based on analyzing optical data can be utilized. In the example scenario of FIG. 1B, the user 130 has placed her computing device 102 inside her purse 120. In this example, the optical sensors or cameras (e.g., 102, 104, 106, 108, etc.) of the device 102 detect no light or only a negligible amount of light, because the device 102 is inside the closed purse 120. Based on observing that little or no light is detected by its cameras (e.g., 102, 104, 106, 108, etc.), the device 102 can predict that the display 112 of the device is likely obstructed, blocked, or otherwise obscured from the user's view. Accordingly, the device 102 can perform a suitable action, such as to dim, blacken, or turn off the display 112 (e.g., stop providing time information), place the device 102 into a locked state, or place the device 102 into a quiescent state (e.g., standby mode, sleep mode, hibernate mode, etc.), or another appropriate action.

In some embodiments, the device 102 can also take into consideration the time of day, the geolocation of the device 102, and/or other factors observed, obtainable, and/or known by the device 102 in order to further increase confidence that the device 102 is obstructed (or obscured) from the user's point of view.

Figure 1C:
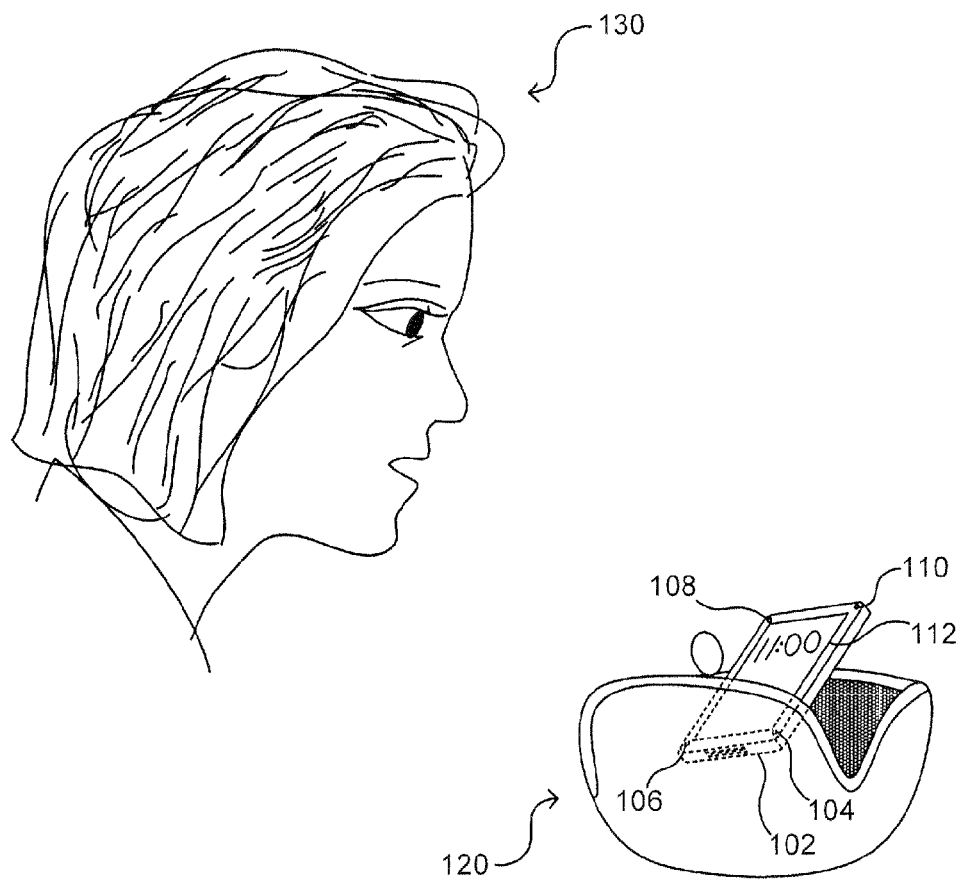
FIG. 1C illustrates an example scenario in which providing information based on analyzing optical data can be utilized.

With reference now to FIG. 1C, FIG. 1C illustrates an example scenario in which providing information based on analyzing optical data can be utilized. In the example of FIG. 1C, the user 130 can open her purse 120 to take a look at her device 102. In this example, the user 130 can pull her device 102 slightly out of her purse 120, such only a top portion of the device display 112 is visible to the user 130.

It follows that the top two cameras (e.g., 108, 110) can be outside of the purse 120 while the bottom two cameras (e.g., 104, 106) can still be within the interior of the purse 120. Accordingly, in this example, the top two cameras (e.g., 108, 110) can detect light and the bottom two cameras (e.g., 108, 110) can only detect little or no light. At the very least, the top cameras (e.g., 108, 110) can detect more light than compared to the bottom cameras (e.g., 104, 106) which can still be obstructed (or obscured) by the purse 120. Based, at least in part, on observing that the top cameras can detect light and the bottom cameras detect little or no light (or observing that the top cameras detect more light than the bottom cameras), the device 102 can determine or predict that a bottom portion of the device display 112 is obstructed by an object or the device's environment (e.g., purse 120). Therefore, the device 102 can update (e.g., adjust, modify, etc.) the providing of the information dependent upon which portion of the device display 112 is likely obstructed and/or which portion is likely unobstructed. In the example of FIG. 1C, the provided information (e.g., time information 11:00) can be displayed at a top portion of the display 112 because the bottom portion has been determined or predicted to be obstructed.

Figure 2A:
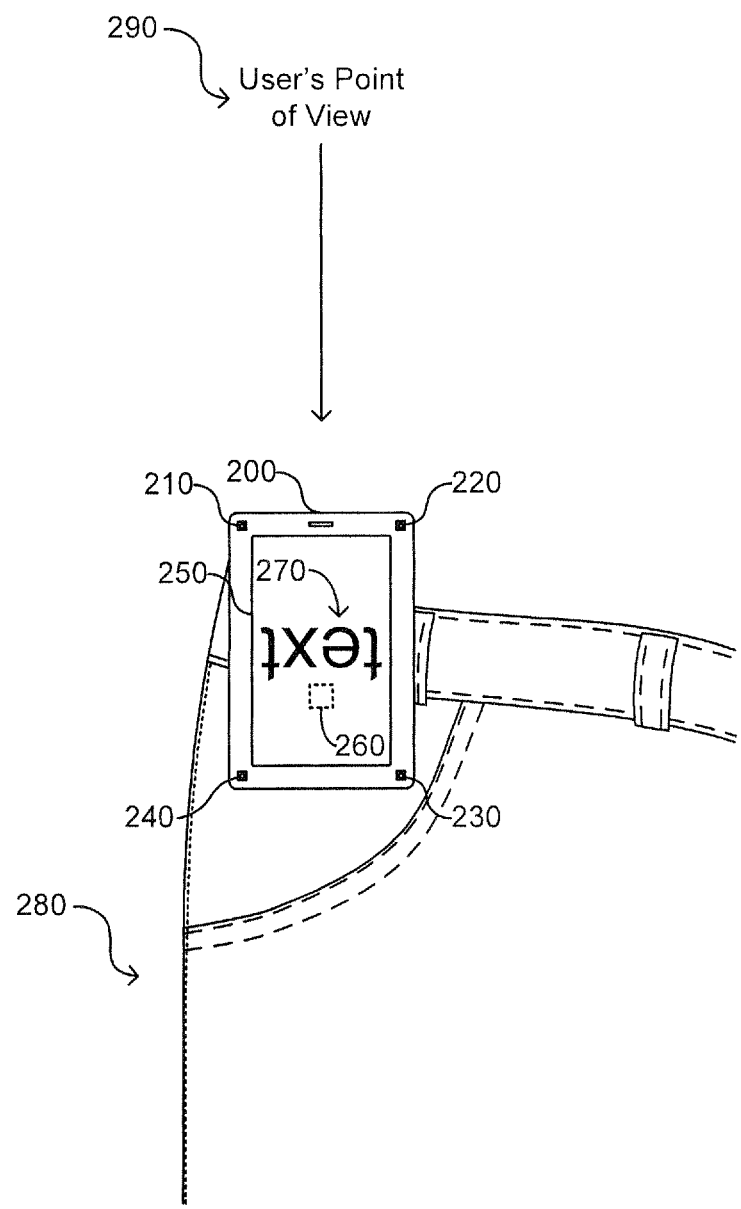
FIG. 2A illustrates an example scenario in which information can be provided to a user based on analyzing optical data.

FIG. 2A illustrates an example scenario in which information can be provided to a user based on analyzing optical data. In FIG. 2A, a computing device 200 can include a plurality of optical sensors (e.g., 210, 220, 230, 240), such as light sensors, image sensors, or cameras. In the example of FIG. 2A, the plurality of optical sensors can be front-facing. The computing device 200 can also include a display 250. The display 250 can be configured to provide information, such as text 270, to a user of the computing device 200. Further, as mentioned above, in some embodiments, the device 200 can also include one or more orientation sensors 260, such as gyroscopes or accelerometers.

As shown in FIG. 2A, there can also be an object, environment, and/or surrounding (e.g., 280) in which the device 200 is situated. In the example of FIG. 2A, there can be a pocket 280, such as a pants pocket, a jacket pocket, a shirt pocket, etc., in which the user places her device 200. It is contemplated that there can also be other objects, environments, and/or surroundings in which the device 200 is situated, such as in a bag, on a table, on a nightstand, in a cup holder, etc.

In FIG. 2A, the device 200 is placed (e.g., taken, moved, etc.) outside of the pocket 280. The plurality of optical sensors (e.g., 210, 220, 230, 240) can capture optical data. The captured optical data for each optical sensor can indicate/include a respective amount of light (i.e., brightness). In this example, since the device 200 is outside of the pocket 280 and since nothing is obstructing the optical sensors, the amount of light associated with each optical sensor can at least meet a specified light amount threshold. In other words, each optical sensor can receive a detectable amount of light. It follows that the device 200 can determine (e.g., deduce, predict, etc.) that the display 250 is likely unobstructed. Thus, information 270 can be provided in full size on the display 250.

In addition, the provided information 270 can be displayed to make the information 270 more legible or easier to view from the user's point of view 290. In FIG. 2A, the user's point of view 290 corresponds to looking downward toward the device 200 and pocket 280. Therefore, the provided information 270 can be displayed to appear right-side up from the user's point of view 290.

As discussed previously, in some instances, the user may not want to completely take her device out of her pocket, bag, or other environment. In one example, the user can be in a meeting such that she does not wish to completely take her device out of her bag, but needs to look at the time. In another example, the device can be snuggly fit in a user's pocket, such that significant effort from the user is required to take the device out of the pocket. In these cases, the user can move the device slightly with respect to the environment, such that the user can view at least a portion of the device display without experiencing the inconvenience and/or interruption of having to significantly move the device, as illustrated in FIG. 2B.

Figure 2B:
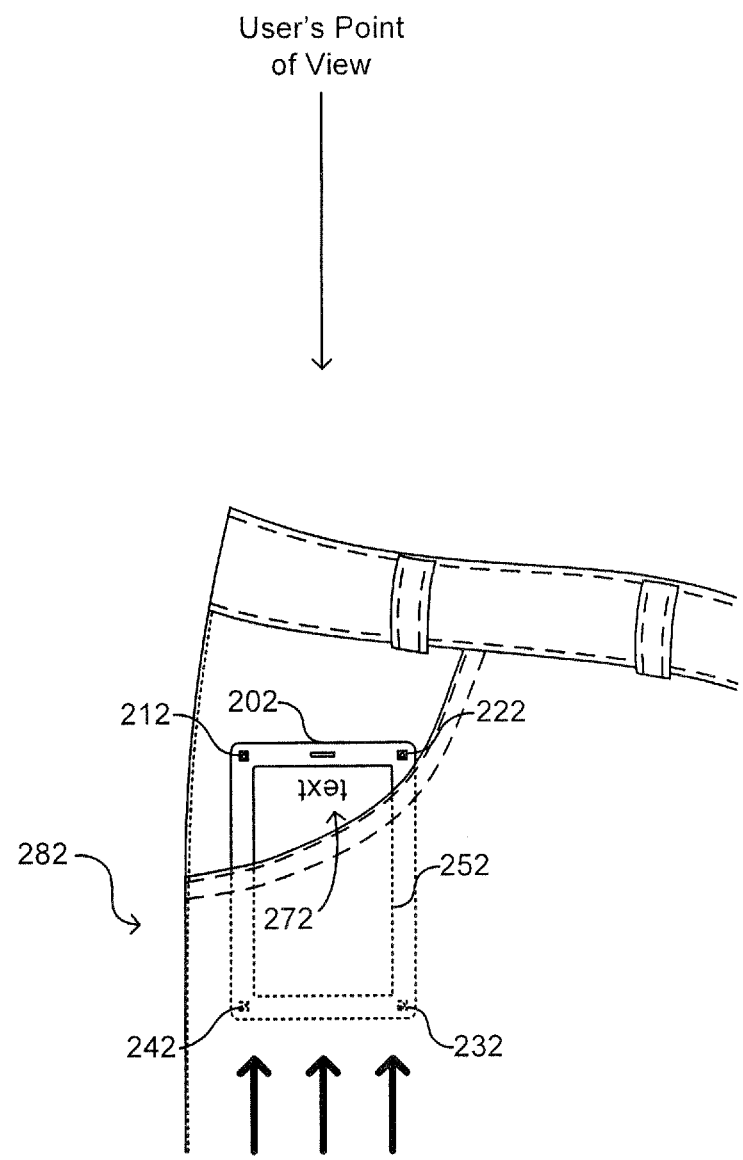
FIG. 2B illustrates an example scenario in which information can be provided to a user based on analyzing optical data.

FIG. 2B illustrates an example scenario in which information can be provided to a user based on analyzing optical data.

In FIG. 2B, the user of the device 202 can slightly pull the device 202 upward such that at least a portion of the display 252 can he visible to her, while the rest of the display 252 can still be obstructed by the pants pocket 282.

When the device 202 is slightly pulled upward, there can be changes to the optical data captured by each optical sensor (e.g., 212, 222, 232, 242). In the example of FIG. 2B, the optical sensors can continuously or at least periodically capture optical data. Since the device 202 had previously been in the pocket 282, none of the optical sensors would previously have been able to receive a detectable amount of light. However, at or near the time when the device 202 is slightly pulled up, two of the optical sensors (212, 222) can detect changes in their captured optical data. Each of the two sensors 212 and 222 can detect that its respective detected optical data incurs an increase in light intensity/amount. However, the other two sensors (232, 242) do not detect optical data changes because they are still obstructed by the pocket 282.

Based, at least in part, on the increase in light detected by optical sensors 212 and 222, the device 202 can determine that an area of the display 252 that is closer in proximity to the two sensors 212 and 222 will likely be unobstructed. Further, the device 202 can also determine that an area of the display 252 that is closer in proximity to the two other sensors (232, 242) will likely be obstructed. Accordingly, the device 202 can provide information 272 within the area of the display 252 that is likely to be unobstructed (i.e., the area that is closer in proximity to sensors 212 and 222).

Moreover, a size of the provided information 272 can be adjusted or modified. In some embodiments, the adjustment (s) can be made dynamically or in real-time. For example, the device 202 can determine or estimate a size associated with the area of the display 252 that is likely to be unobstructed (i.e., likely visible to the user). In FIG. 2B, this area can be a portion of the display 252 that is closer to sensors 212 and 222. Based, at least in part, on the size of the area, the device 202 can adjust or modify a size of the provided information 272. In the example of FIG. 2B, the size of the provided information 272 can be decreased (relative to the provided information 270 of FIG. 2A) because the size of the display area likely to be unobstructed has decreased.

Figure 2C:
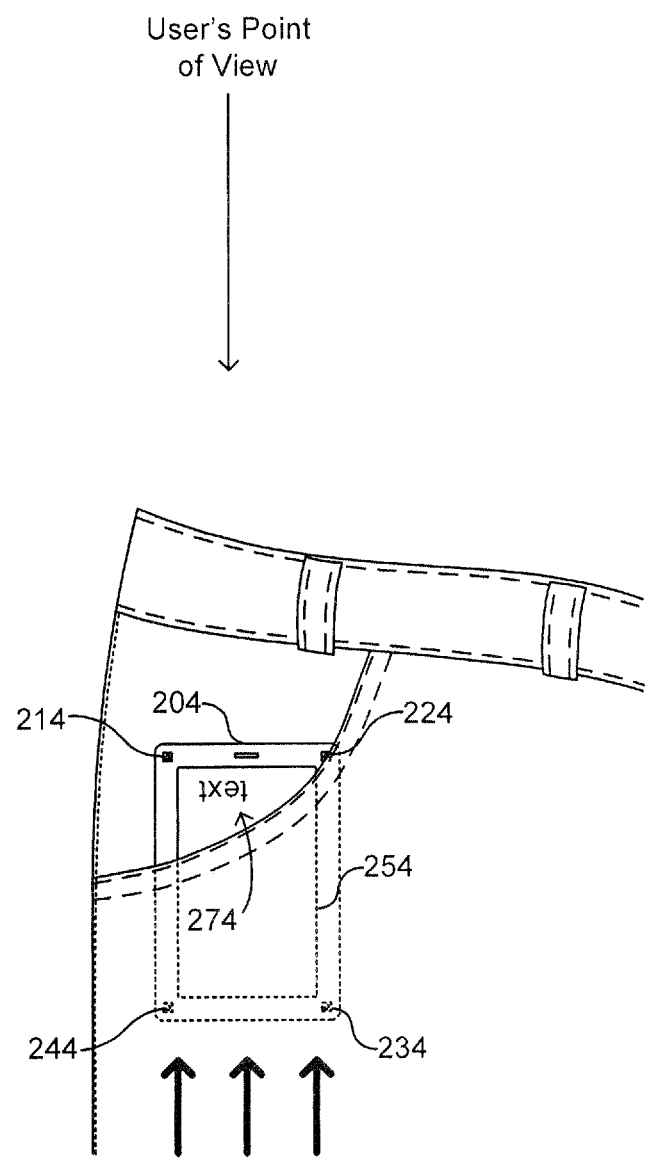
FIG. 2C illustrates an example scenario in which information can be provided to a user based on analyzing optical data.

FIG. 2C illustrates an example scenario in which information can be provided to a user based on analyzing optical data. In FIG. 2C, the computing device 204 can include optical sensors 214, 224, 234, 244, which are configured to detect a range of light intensities/amounts, as opposed to just being able to detect "light" or "no light" only. In the example of FIG. 2C, the user can have moved the device 204 in a manner such that sensor 214 is unobstructed, sensor 224 is partially obstructed and partially unobstructed, and sensors 234 and 244 are obstructed. As such, for example, sensor 214 can detect a 95% amount/level of light, while sensor 224 can detect a 55% amount/level of light. Moreover, sensors 234 and 244 can each detect a 1% amount/level of light.

In this example, based on the various amounts of light detected in the captured optical data, the device 204 can determine that an area of the display 254 that is closer to sensors 214 and 224 is likely unobstructed. This can be because both sensors 214 and 224 detect at least some light whereas sensors 234 and 244 detect no light or negligible amounts of light. Further, the device 204 can determine that a sub-area of the display 254 that is closer to sensor 214 will likely be the most unobstructed or the most visible to the user, because sensor 214 detected more light than sensor 224. According, the displaying of the provided information 274 can be modified, causing the information 274 to be displayed closer to sensor 214, as shown in FIG. 2C. This can increase the user's visibility, legibility, and/or ease of access with respect to the provided information.

Figure 2D:
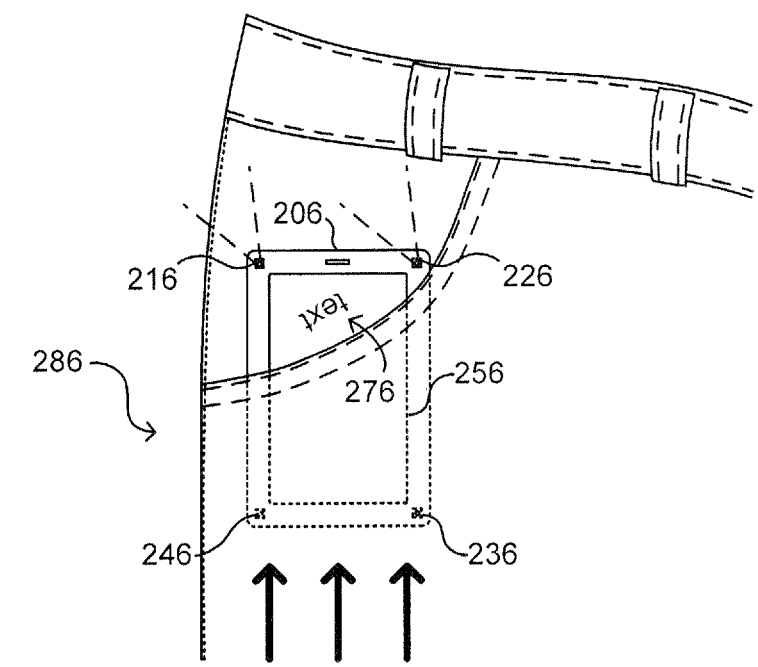
FIG. 2D illustrates an example scenario in which information can be provided to a user based on analyzing optical data and using head tracking.

FIG. 2D illustrates an example scenario in which information can be provided to a user based on analyzing optical data and using head tracking. In FIG. 2D, information 276 can be provided or displayed at an area or portion of the display 256 determined as being likely unobstructed and/or visible from the user's perspective.

In some embodiments, the plurality of optical sensors can include a plurality of cameras or image sensors (e.g., 216, 226, 236, 246). As shown in FIG. 2D, sensors 216 and 226 can be unobstructed by the pocket 286, whereas sensors 236 and 246 are obstructed. In one example, sensors 216 and 226 (e.g., image sensors, cameras, etc.) can capture optical data (e.g., image data) including a feature (or at least a portion thereof) of the user, such as the user's facial feature or head. Based, at least in part, on the optical data (e.g., image data) including the user's feature, a positional relationship can be determined between the user (or her feature) and the computing device 206. Based on this positional relationship, a position (e.g., orientation) of the provided information 276 can be modified. Again, this can increase the user's visibility, legibility, and/or ease of access with respect to the provided information. For example, if the user tilts her head, the information displayed can also be tilted correspondingly, as shown in FIG. 2D, such that the user can still read, view, or otherwise interact with the information.

Figure 2E:
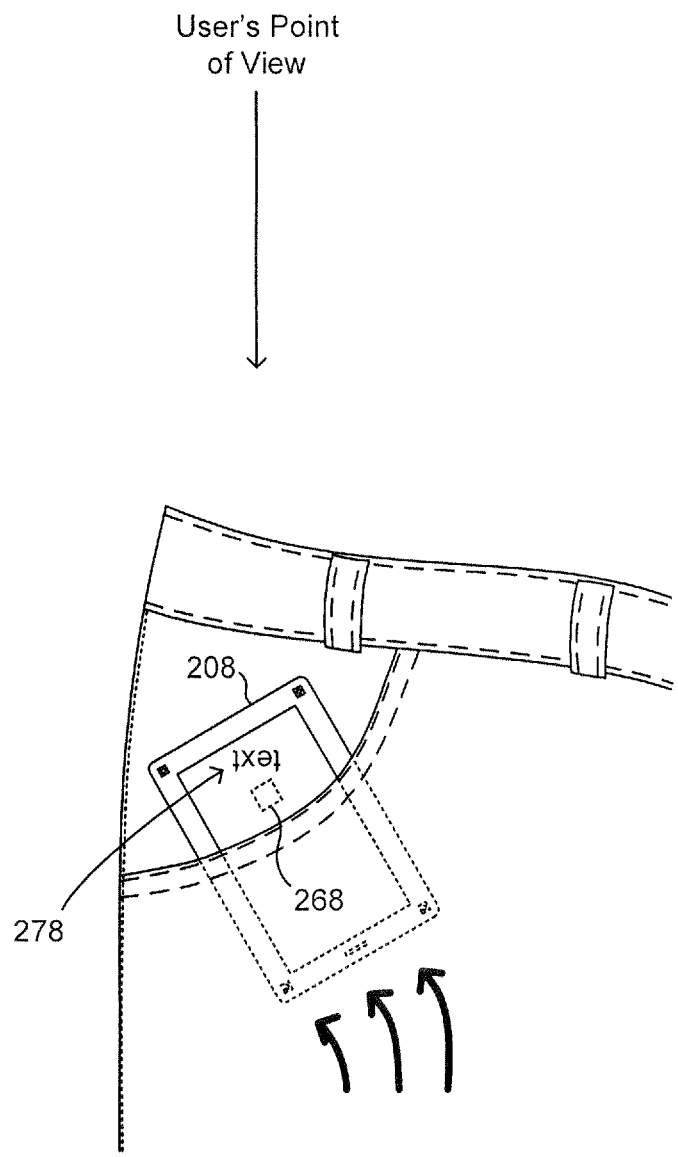
FIG. 2E illustrates an example scenario in which information can be provided to a user based on analyzing optical data and orientation data.

FIG. 2E illustrates an example scenario in which information can he provided to a user based on analyzing optical data and orientation data. In some embodiments, the computing device 208 can utilize at least one orientation sensor 268, alone or in conjunction with one or more other sensors, to adjust a position (e.g., orientation) of the provided information 278 being displayed. As shown in the example of FIG. 2E, when the user moves the device 208 resulting in the device's orientation being tilted, the provided information 278 being displayed can also be tilted correspondingly to counter the tilted orientation of the device 208.

Figure 3:
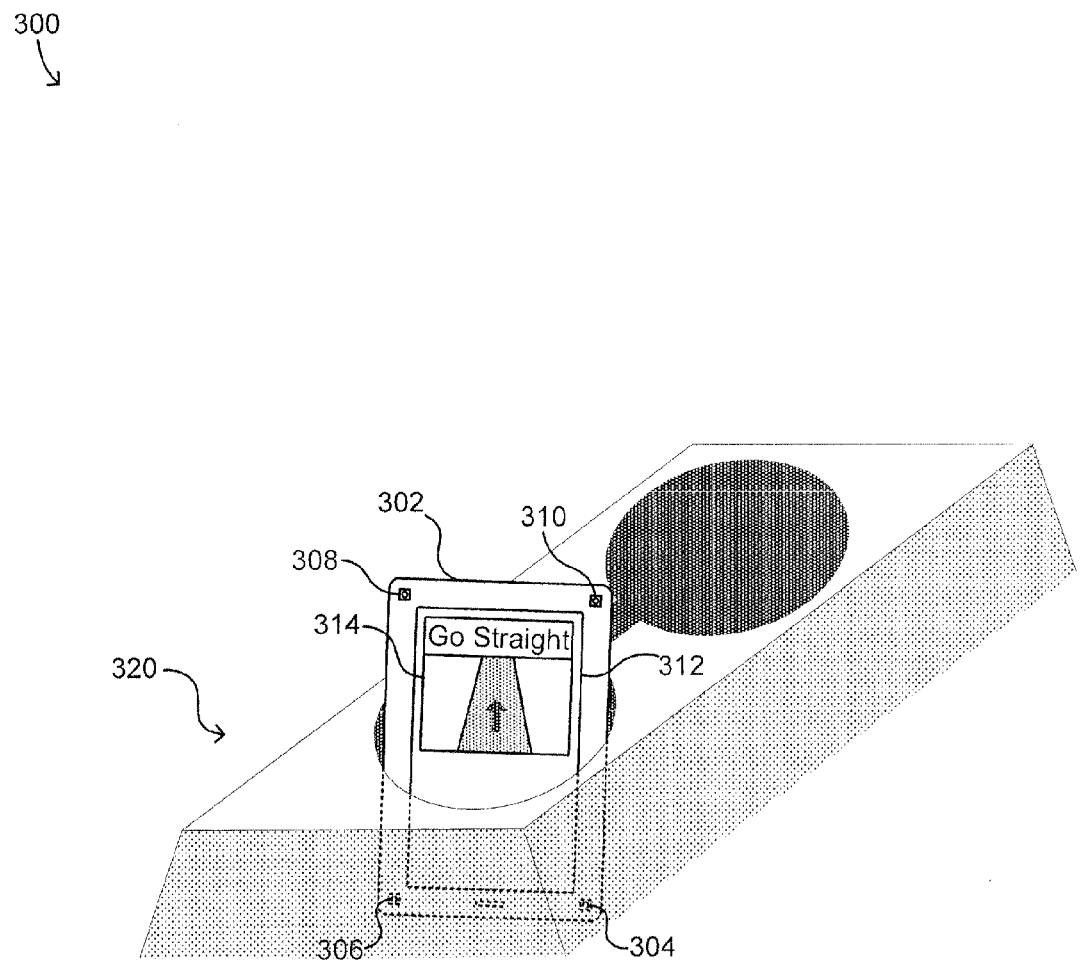
FIG. 3 illustrates an example scenario in which providing information based on analyzing optical data can be utilized.

FIG. 3 illustrates an example scenario in which providing information based on analyzing optical data can be utilized. The example scenario 300 can include a computing device 302 being situated in a cup holder environment 320. The computing device 302 can include optical sensors 304, 306, 308, and 310, as well as a display 312.

In some embodiments, the optical sensors can capture optical data and the device 302 can determine that the top sensors (308 and 310) are unobstructed, whereas the bottom sensors (304 and 306) are obstructed. Moreover, using one or more geolocation and/or motion sensors of the device 302, the device 302 can determine the environment in which it is likely situated. In the example of FIG. 3, the device 302 can determine (e.g., deduce, predict), based on the detected movements patterns (e.g., bumps on the road, acceleration, velocity, etc.) as well as the captured optical data, that the device 302 is likely sitting in a car cup holder 320. As such, the device 302 can provide relevant information 314, such as navigation information, to the user at the visible/unobstructed portion of the display 312 (e.g., top portion). Moreover, if an incoming communication is received (e.g., phone call, text message, etc.), relevant information associated with the incoming communication (including details about the communication and/or an interface for interacting with the communication) can be provided at the visible/unobstructed display portion. A person of ordinary skill in the art would recognize that other types of relevant information can be provided as well. In some embodiments, relevant information can correspond to information having a likelihood of being relevant to the user of the computing device. In some cases, the disclosed technology can determine the information having a likelihood of being relevant to the user of the device. In some cases, this can be achieved based on device configurations (e.g., predefined settings, default settings, etc.), and/or based on current and/or past activities of the device.

In some embodiments, various sensors (e.g., optical, orientation, geolocation, motion, sonic, etc.) of the computing device can be used individually or in any combination with one another, to facilitate in determining where or how to provide the information.

Figure 4A:
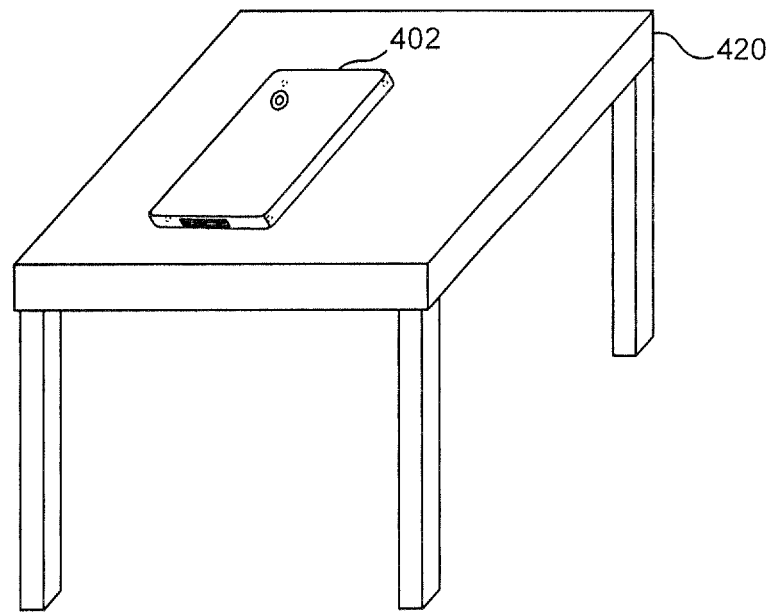
FIG. 4A illustrates an example scenario in which providing information based on analyzing optical data can be utilized.
Figure 4B:
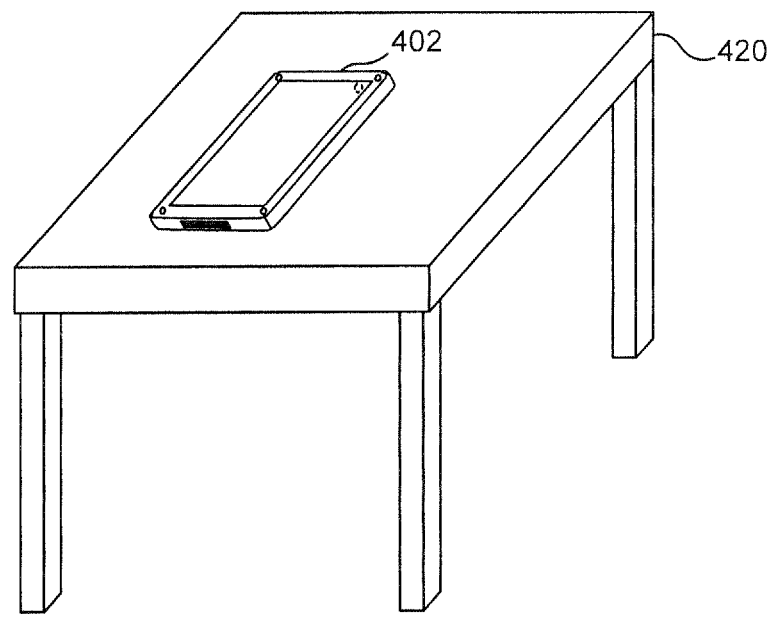
FIG. 4B illustrates an example scenario in which providing information based on analyzing optical data can be utilized.

FIG. 4A and FIG. 4B each illustrates an example scenario in which providing information based on analyzing optical data can be utilized. In FIG. 4A and FIG. 4B, a computing device 402 can be situated with respect to an object or environment, such as a physical surface 420. For example, the physical surface can include a table top, a floor, a chair, an armrest, a mouse-pad, or another tangible surface.

In the example of FIG. 4A, the computing device 402 can be placed in a manner such that its front face is facing down on the surface of the table 420. As such, the optical sensors of the device 402 may not receive detectable or sufficient amounts of light. From this and/or other information (e.g., orientation data), the device 402 can determine that it is facing down, and thus respond accordingly. In some embodiments, the device 402 can enter into a locked state. In some embodiments, the device 402 can dim or blacken the display screen. In some embodiments, the device 402 can stop the information from being provided or displayed. In some embodiments, the device 402 can enter into a quiescent state (e.g., sleep mode, hibernate mode, etc.). Further, in some embodiments, the device 402 can take into account an amount of inactivity associated with the device 402 when determining/deciding how to respond accordingly.

In the example of FIG. 4B, the device 402 can determine that it has been flipped over (relative to FIG. 4A) and/or that its front face is facing upward on the table 420. The device 402 can respond appropriately. For example, the device 402 can unlock itself from a previously locked state. In another example, the device 402 can brighten its display screen. In a further example, the device 402 can initiate the providing or displaying of relevant information. In another example, the device 402 can exit out of a quiescent state. Moreover, in some embodiments, the device 402 can take into account an amount of activity associated with the device 402 when deciding/determining how to respond appropriately.

Figure 5:
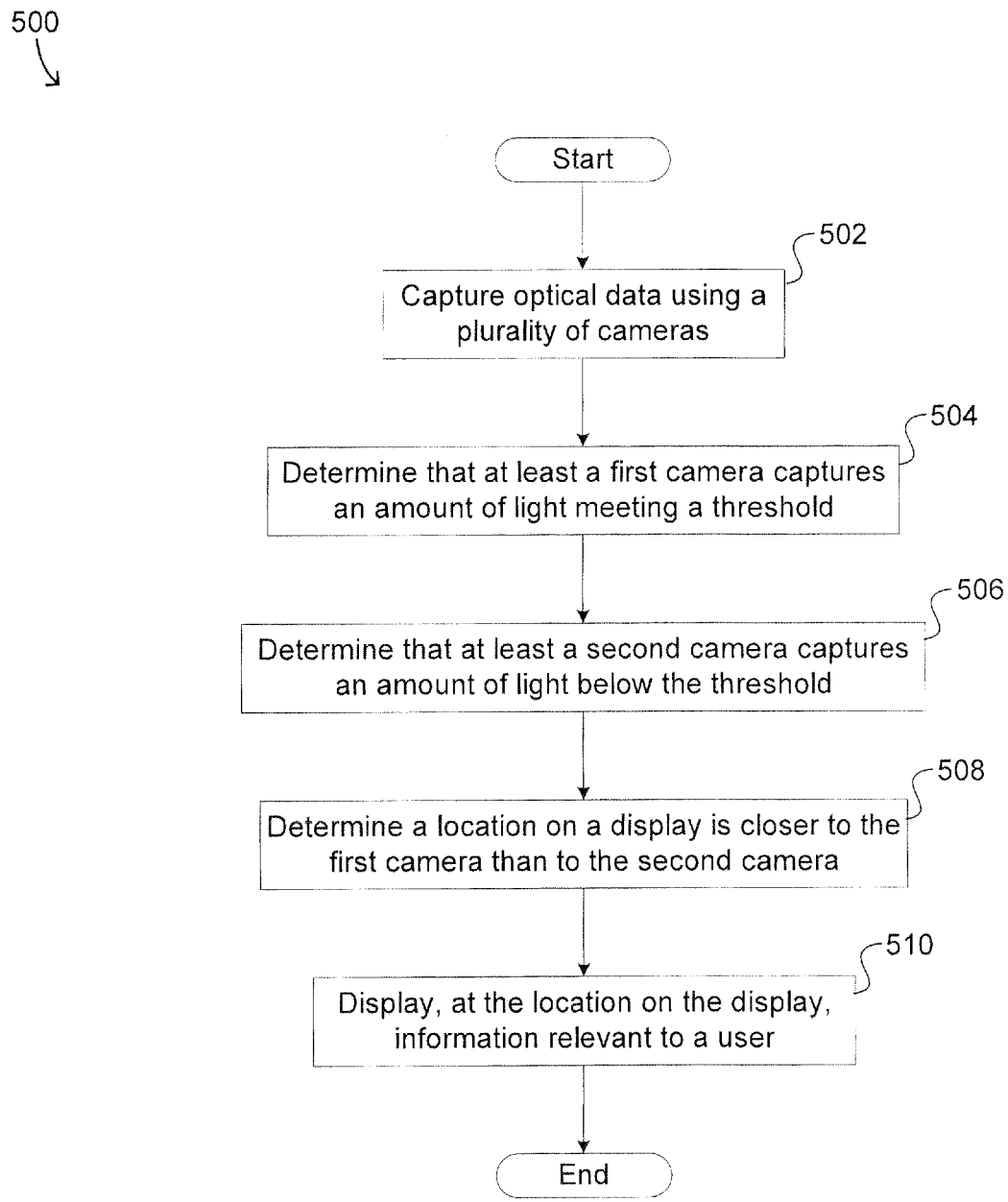
FIG. 5 illustrates an example method embodiment for providing information based on analyzing optical data.

FIG. 5 illustrates an example method embodiment 500 for providing information based on analyzing optical data. It should be understood that there can be additional, fewer, or alternative steps performed in similar or alternative orders, or in parallel, within the scope of the various embodiments unless otherwise stated. At step 502, the example method embodiment 500 can capture optical data using a plurality of cameras of the computing device. In some cases, the plurality of cameras can include four cameras. In some instances, each of the four cameras can be located substantially at a respective corner of a front face of the computing device.

At step 504, the example method 500 can determine that at least a first camera captures optical data including an amount of light that at least meets a specified light amount threshold. Step 506 can include determining that at least a second camera captures optical data including an amount of light below the specified light amount threshold. The example method 500 can then determine a location on a display of the computing device that is closer in proximity to the at least the first camera than to the at least the second camera, at step 508. Then at step 510, the method 500 can display information relevant to a user of the computing device. The information can be displayed at the determined location on the display of the computing device.

In some embodiments, the method can determine a portion of the display that is within an allowable distance from the at least the second camera. Then the method can increase a confidence score representing a likelihood that the portion of the display is obstructed by one or more objects. The confidence score can be increased based, at least in part, on determining that the at least the second camera captures optical data including the amount of light below the specified light amount threshold. Moreover, the location on the display at which the information is displayed can be outside the portion of the display.

Figure 6:
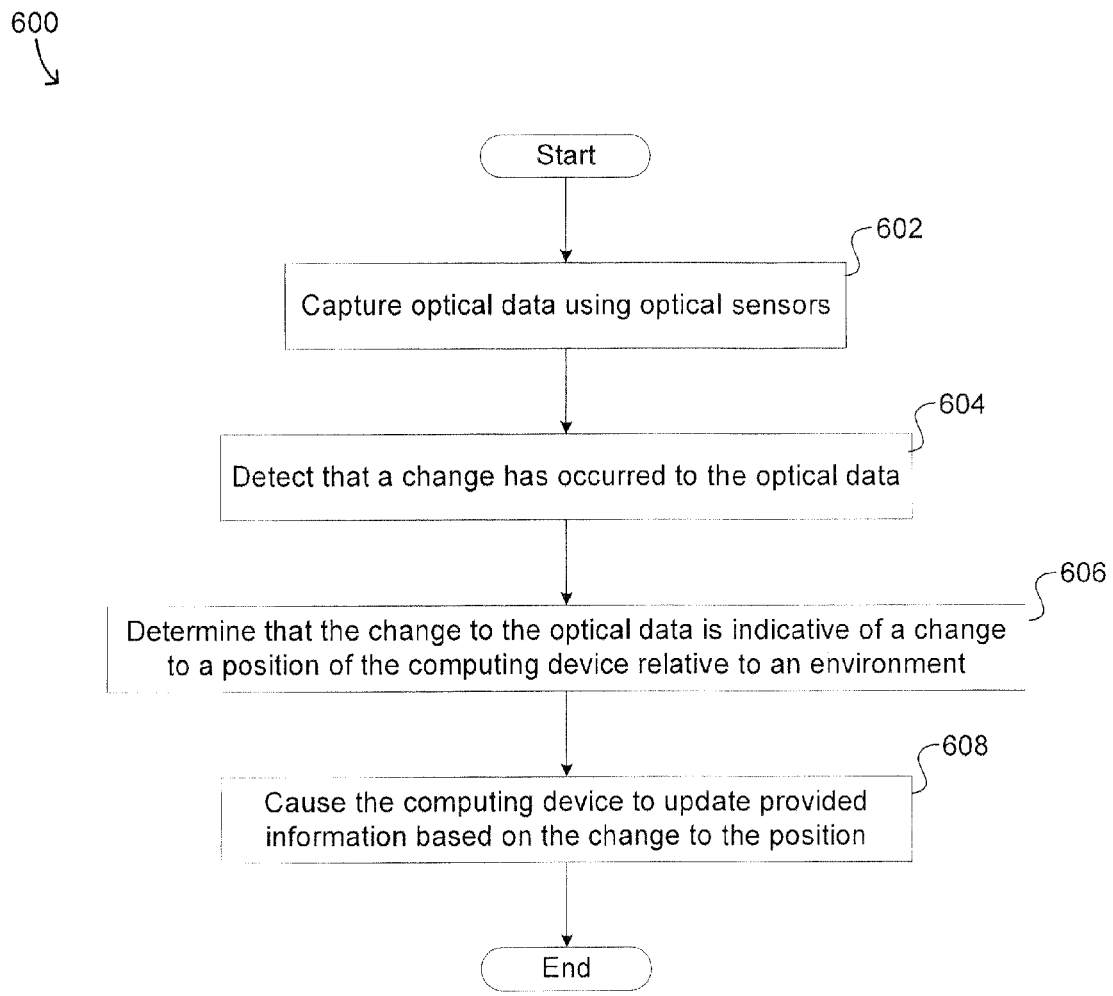
FIG. 6 illustrates an example method embodiment for providing information based on analyzing optical data.

FIG. 6 illustrates an example method embodiment 600 for providing information based on analyzing optical data. Again, it should be understood that there can be additional, fewer, or alternative steps performed in similar or alternative orders, or in parallel, within the scope of the various embodiments unless otherwise stated. The example method embodiment 600 can start with capturing optical data using one or more optical sensors of a computing device, at step 602. Then at step 604, the example method 600 can detect that a change has occurred in the optical data captured using the one or more optical sensors of the computing device.

Step 606 can include determining that the change in the optical data is indicative of a change to a position of the computing device relative to an environment in which the computing device is situated. Then the method 600 can cause the computing device to update provided information. The provided information can be updated based, at least in part, on the change to the position of the computing device relative to the environment.

In some embodiments, the optical sensors can enter a low or lesser powered state. For example, when the optical sensors need to capture optical data more accurately, they can exit the low/lesser-powered state. However, when the optical sensors do not necessarily need to capture optical data accurately (e.g., operating in binary light detection mode), they can enter the low/lesser-powered state.

It is further contemplated that there can he many other uses and/or applications associated with the various embodiments of the present disclosure that a person having ordinary skill in the art would recognize.

Figure 7:
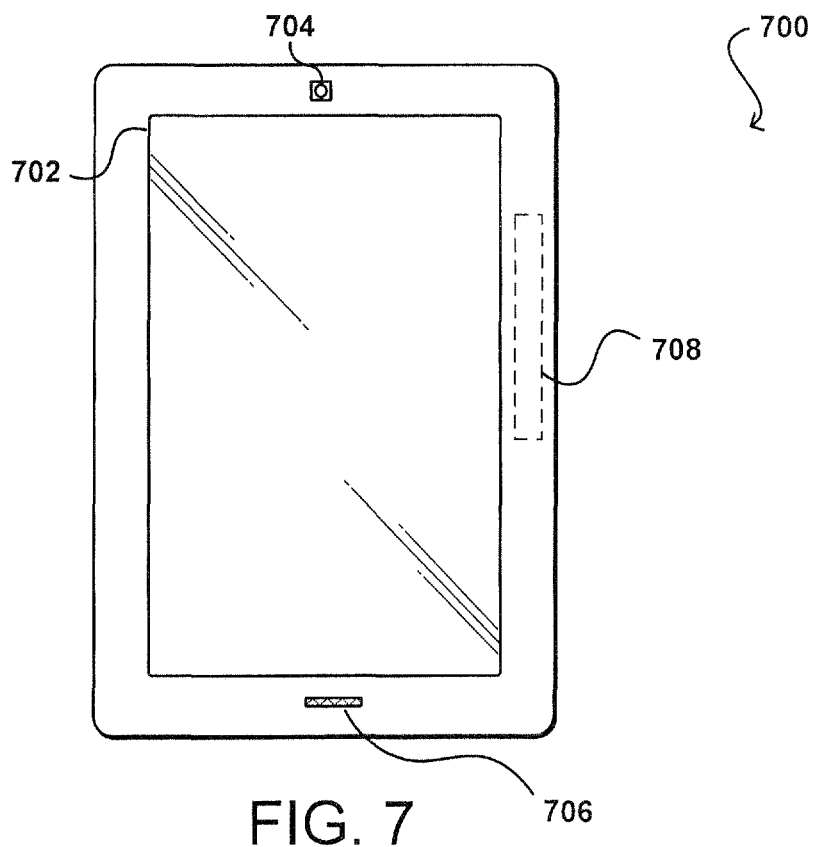
FIG. 7 illustrates an example device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In some embodiments, a computing device can be an analog device, such as a device that can perform signal processing using operational amplifiers. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 8:
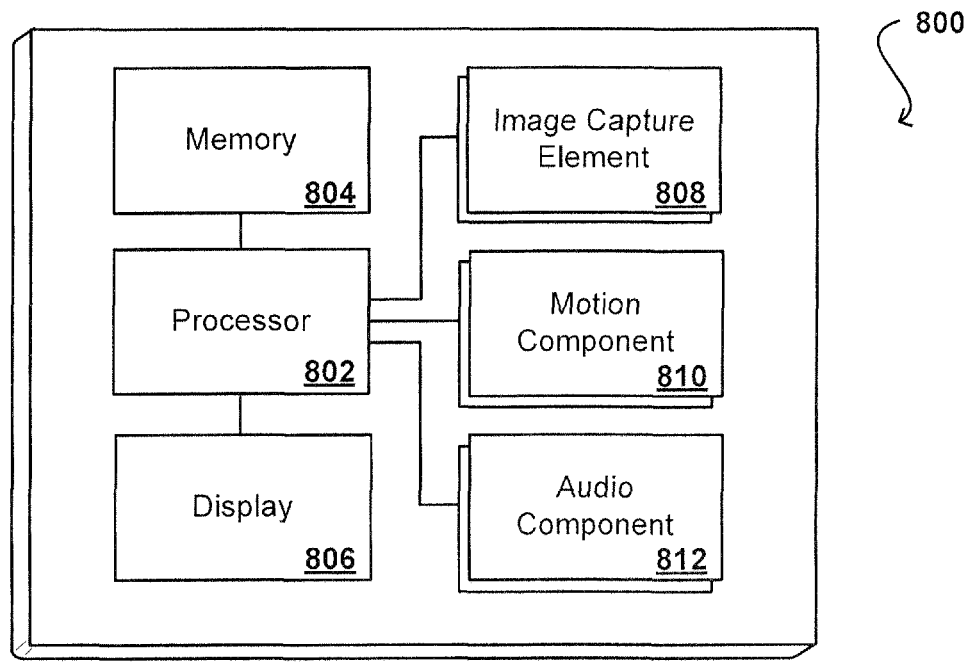
FIG. 8 illustrates example components of a client device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device.

Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 812, such as a mono or stereo microphone or microphone array, operable to capture audio information from at least one primary direction. A microphone can be a uni- or omni-directional microphone as known for such devices.

In some embodiments, the computing device 800 of FIG. 8 can include one or more communication elements (not shown), such as a Wi-Fi, Bluetooth, RF, wired, or wireless communication system. The device in many embodiments can communicate with a network, such as the Internet, and may be able to communicate with other such devices. In sonic embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device such as that described with respect to FIG. 7 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 9:
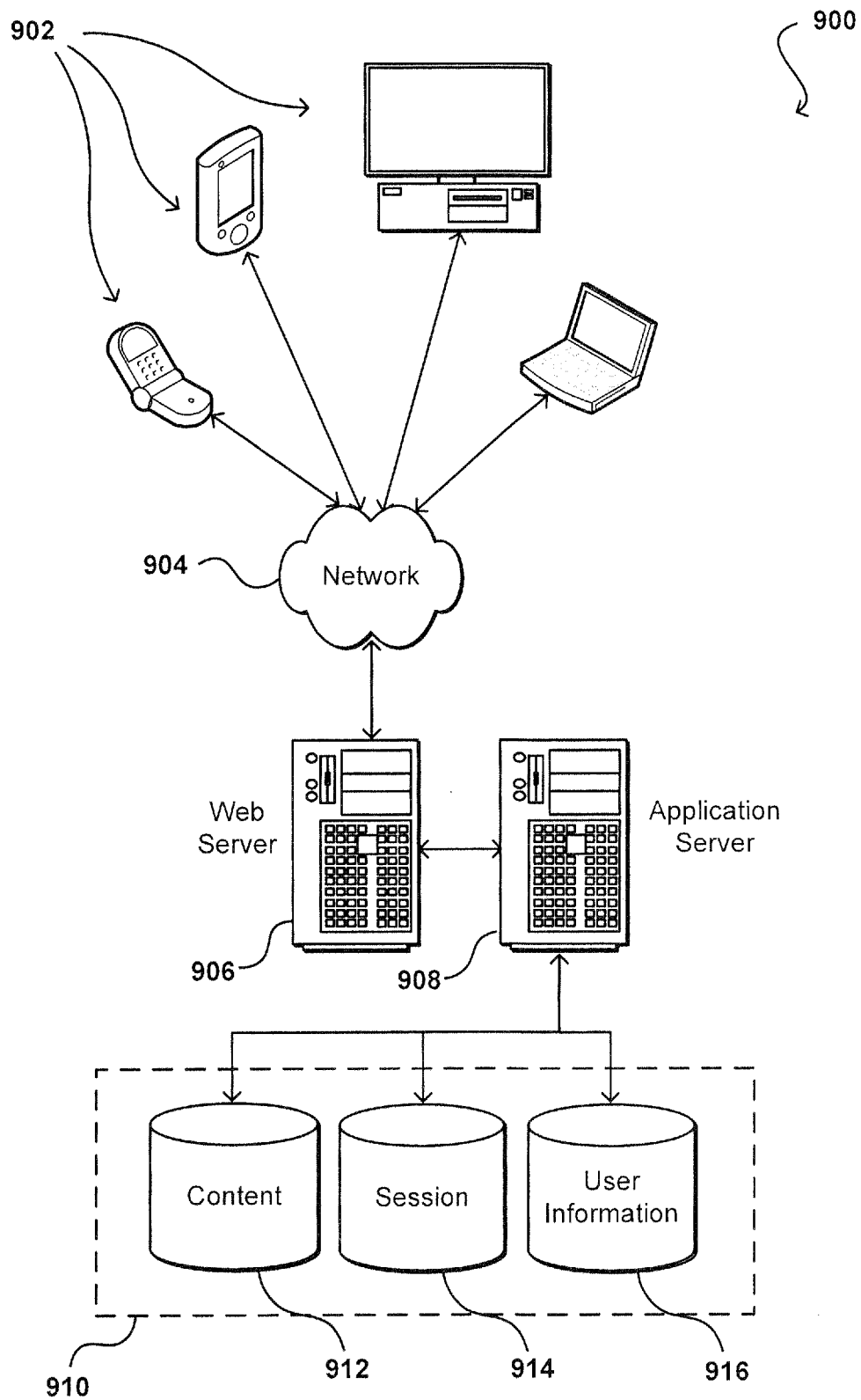
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device comprising:
   a first camera and a second camera located on a front face of the computing device;
   a display on the front face of the computing device;
   at least one processor; and
   a memory device including instructions that, when executed by the at least one processor, cause the computing device to:
   acquire first optical data using the first camera;
   acquire second optical data using the second camera;
   analyze the first optical data to determine that a first brightness level associated with the first optical data at least meets a specified brightness threshold;
   analyze the second optical data to determine that a second brightness level associated with the second optical data is below the specified brightness threshold;
   display information on the display of the computing device at a location closer to the first camera than the second camera;
   determine a second location of the display that is within an allowable distance from the second camera;
   increase a confidence score representing a likelihood that the second location of the display is obstructed by one or more objects, the confidence score being increased based, at least in part, on determining that the second brightness level associated with the second optical data is below the specified brightness threshold; and
   cause the information to be displayed outside the second location of the display.

2. The computing device of claim 1, wherein the information includes a content item to be displayed, and wherein the instructions cause the computing device to further:
   determine a distance between the location and the second location; and
   modify a size of the content item to be displayed based, at least in part, on the distance, wherein the size is increased when the distance increases, and wherein the size is decreased when the distance decreases.

3. The computing device of claim 1, further comprising:
   one or more orientation sensors configured to capture orientation data associated with the computing device, wherein the information is displayed based, at least in part, on the orientation data.

4. The computing device of claim 1, wherein the first optical data includes a representation of at least a portion of a feature of a user of the computing device, and wherein the instructions cause the computing device to further:
   determine a relative position of the computing device with respect to the at least the portion of the feature of the user; and
   determine how to display the information based, at least in part, on the relative position of the computing device with respect to the feature of the user.

5. A computer-implemented method comprising:
   acquiring first optical data using a first optical sensor;

acquiring second optical data using a second optical sensor;

analyzing the first optical data and the second optical data to determine that a first brightness level associated with the first optical data is higher than a second brightness level associated with the second optical data;

displaying information on a display of a computing device at a first location closer to the first optical sensor than the second optical sensor;

determining a second location of the display that is within an allowable distance from the second optical sensor;

increasing a confidence score representing a likelihood that the second location of the display is obstructed by one or more objects, the confidence score being increased based, at least in part, on determining that the second brightness level associated with the second optical data is below a specified brightness threshold; and causing the information to be displayed outside the second location of the display.

6. The computer-implemented method of claim 5, further comprising:

causing at least one of: the computing device to be unlocked from a locked state or the computing device to exit from a quiescent state.

7. The computer-implemented method of claim 5, further comprising:

determining that each of the first brightness level and the second brightness level is below a second specified brightness threshold; and causing at least one of: the computing device to enter into a locked state, the computing device to enter into a quiescent state, the first optical sensor to enter into a lesser-powered state, or the second optical sensor to enter into the lesser-powered state.

8. The computer-implemented method of claim 5, wherein the information includes a content item to be displayed, and the method further comprises:

modifying a size of the content item to be displayed based, at least in part, on how close a portion of the display is relative to the second optical sensor, wherein the size of the content item is increased when the portion of the display is closer to the second optical sensor.

9. The computer-implemented method of claim 5, further comprising:

capturing orientation data associated with the computing device using one or more orientation sensors of the computing device, wherein causing the information to be displayed is based, at least in part, on the orientation data associated with the computing device.

10. The computer-implemented method of claim 5, wherein at least one of the first optical data or the second optical data includes a representation of at least a portion of a feature of a user of the computing device, and wherein the method further comprises:

determining a relative position of the computing device with respect to the at least the portion of the feature of the user, wherein causing the information to be displayed is based, at least in part, on the relative position of the computing device with respect to the feature of the user.

11. A non-transitory computer-readable storage medium including instructions, the instructions when executed by a processor of a computing device causing the computing device to:

acquire first optical data using a first optical sensor;

acquire second optical data using a second optical sensor;

analyze the first optical data and the second optical data to determine that a first brightness level associated with the first optical data is higher than a second brightness level associated with the second optical data;

display information on a display of the computing device at a first location closer to the first optical sensor than the second optical sensor;

determine a second location of the display that is within an allowable distance from the second optical sensor;

increase a confidence score representing a likelihood that the second location of the display is obstructed by one or more objects, the confidence score being increased based, at least in part, on determining that the second brightness level associated with the second optical data is below the specified brightness threshold; and cause the information to be displayed outside the second location of the display.

12. The non-transitory computer-readable storage medium of claim 11, wherein the instructions cause the computing device to further:

capture orientation data associated with the computing device using one or more orientation sensors of the computing device, wherein cause the information to be displayed is based, at least in part, on the orientation data associated with the computing device.

13. The non-transitory computer-readable storage medium of claim 11, wherein at least one of the first optical data or the second optical data includes a representation of at least a portion of a feature of a user of the computing device, and wherein the instructions cause the computing device to further:

determine a relative position of the computing device with respect to the at least the portion of the feature of the user, wherein the instructions that cause the information to be displayed is based, at least in part, on the relative position of the computing device with respect to the feature of the user.

14. The non-transitory computer-readable storage medium of claim 11, wherein the instructions cause the computing device to further:

cause at least one of the computing device to be unlocked from a locked state or the computing device to exit from a quiescent state.

15. The non-transitory computer-readable storage medium of claim 11, wherein the instructions cause the computing device to further:

determine that each of the first brightness level and the second brightness level is below a second specified brightness threshold; and cause at least one of the computing device to enter into a locked state, the computing device to enter into a quiescent state, the first optical sensor to enter into a lesser-powered state, or the second optical sensor to enter into the lesser-powered state.

* * * * *